United States Patent
Herzig

(10) Patent No.: US 11,370,543 B2
(45) Date of Patent: Jun. 28, 2022

(54) AIRCRAFT PYLON

(71) Applicant: ISRAEL AEROSPACE INDUSTRIES LTD., Lod (IL)

(72) Inventor: Yoav Herzig, Ein Sarid (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 83 days.

(21) Appl. No.: 16/835,684

(22) Filed: Mar. 31, 2020

(65) Prior Publication Data

US 2020/0247541 A1 Aug. 6, 2020

Related U.S. Application Data

(63) Continuation-in-part of application No. 15/128,169, filed as application No. PCT/IL2015/050298 on Mar. 22, 2015, now abandoned.

(30) Foreign Application Priority Data

Mar. 23, 2014 (IL) .......................................... 231653

(51) Int. Cl.
 *B64D 1/02* (2006.01)
 *B64D 9/00* (2006.01)

(52) U.S. Cl.
 CPC ................. *B64D 9/00* (2013.01); *B64D 1/02* (2013.01)

(58) Field of Classification Search
 CPC ............... B64D 1/04; B64D 1/06; B64D 1/08
 See application file for complete search history.

(56) References Cited

U.S. PATENT DOCUMENTS

| 2,469,363 A | 5/1949 | Biondi |
| 2,520,317 A | 8/1950 | Laddon et al. |
| 3,174,712 A | 3/1965 | Ricard |

(Continued)

FOREIGN PATENT DOCUMENTS

| DE | 1116539 B | 11/1961 |
| GB | 744609 A | 2/1956 |
| GB | 784929 A | 10/1957 |

OTHER PUBLICATIONS

International Search Report and Written Opinion from International Application No. PCT/IL2015/050298 dated Jul. 14, 2015.

(Continued)

*Primary Examiner* — Tye William Abell
(74) *Attorney, Agent, or Firm* — Dorsey & Whitney LLP

(57) ABSTRACT

A pylon for mounting to a bottom surface of an aircraft and for carrying an external payload is provided. The pylon comprises a body spanning along a vertical axis between an upper face and a lower face, the upper face comprising one or more mounting arrangements configured to facilitate mounting the pylon to the bottom surface of the aircraft, the lower face comprising at least one suspension mechanism configured to facilitate selective attachment of the payload to the pylon. The pylon further comprises a covering arrangement configured for selective shifting between a closed position in which it covers the suspension mechanism and an open position in which the suspension mechanism is uncovered. The width of the body varies smoothly along the vertical axis between, inclusively, the upper and lower faces.

11 Claims, 2 Drawing Sheets

(56) References Cited

U.S. PATENT DOCUMENTS

| | | | |
|---|---|---|---|
| 4,802,641 A * | 2/1989 | Hardy | B64D 1/04 |
| | | | 244/137.4 |
| 4,867,394 A | 9/1989 | Patterson | |
| 5,803,405 A * | 9/1998 | Ellis | B64D 1/06 |
| | | | 244/129.5 |
| 6,068,215 A * | 5/2000 | Gruensfelder | B64C 1/1415 |
| | | | 244/129.5 |
| 6,460,445 B1 | 10/2002 | Young et al. | |
| 6,663,047 B1 | 12/2003 | Arata | |
| 7,610,841 B2 | 11/2009 | Padan | |
| 7,887,011 B1 | 2/2011 | Baldwin | |
| 2005/0204910 A1* | 9/2005 | Padan | B64D 1/04 |
| | | | 89/1.813 |
| 2009/0100995 A1 | 4/2009 | Fisher | |
| 2010/0140406 A1* | 6/2010 | Walton | B64C 1/1415 |
| | | | 244/129.5 |
| 2013/0221158 A1* | 8/2013 | Binkholder | F41F 3/065 |
| | | | 89/1.51 |
| 2013/0259641 A1 | 10/2013 | Stewart et al. | |
| 2016/0244164 A1 | 8/2016 | Colosimo | |

OTHER PUBLICATIONS

"Fluid Dynamic Drag", No date, 3 pages.
Marsden, et al., "Aerodynamic Loads on External Stores: A Review of Experimental Data and Method of Prediction", Ministry of Technology, Aeronautical Research Council Reports and Memoranda, 1967, pp. 1-107.

\* cited by examiner

AIRCRAFT PYLON

TECHNOLOGICAL FIELD

The presently disclosed subject matter relates to an aircraft pylon in general and in particular to an aircraft pylon having a suspension mechanism.

BACKGROUND

An aircraft pylon is a suspension device externally installed on the bottom side of an aircraft, typically under the wing or fuselage thereof, to facilitate externally attaching a payload, such as a fuel tank, munitions, chaff, etc., thereto.

Typically, pylons are characterized by having an elongate profile when viewed along the roll axis of the aircraft, i.e., along the direction of travel, spanning between a top end of the pylon which is connected to the aircraft, and a bottom end of the pylon. Arrangements for carrying the payload are provided at the bottom end of the pylon, i.e., spaced from the aircraft along the yaw axis. Accordingly, a pylon may be used to space a payload from the aircraft, thereby only minimally interrupting airflow therealong, thus allowing, as much as possible, the aircraft to operate under aerodynamic conditions similar to those for which it was designed. Moreover, the pylon may be much thinner (i.e., its dimension along the pitch axis being much smaller) than the payload is.

In contrast, an external payload may also be attached to an aircraft using a pod. While pods are typically connected to the bottom of an aircraft, they differ from pylons in that they are designed to carry their payload therewithin, and their profile when viewed along the roll axis of the aircraft is generally very wide. For example, they may be wider, i.e., have a dimension along the direction of the pitch axis of the aircraft, which is almost as wide, or wider, than the payload being carried thereby. Moreover, the aircraft is often configured to release the pod during flight, for example when the payload has been released or used. In practice, a pod may be mounted to a pylon which is mounted on an aircraft, thereby spacing it therefrom.

SUMMARY

According to an aspect of the presently disclosed subject matter, is provided a pylon configured for being mounted to a bottom surface of an aircraft and for carrying an external payload, i.e., being external thereto, the pylon comprising:

a body spanning along a vertical axis between an upper face and a lower face, the upper face comprising one or more mounting arrangements configured to facilitate mounting the pylon to the bottom surface of the aircraft, the lower face comprising at least one suspension mechanism configured to facilitate selective attachment of the payload to the pylon; and a covering arrangement configured for selective shifting between a closed position thereof in which it covers the suspension mechanism and an open position thereof in which the suspension mechanism is uncovered;

wherein the width of the body, in a direction mutually perpendicular to the vertical axis and to the direction of travel of the aircraft, varies smoothly along the vertical axis between, inclusively, the upper and lower faces.

The lower face of the body may be characterized by a fixed width which is no greater than 50% more than the width of the upper face of the body.

The width of the lower face may be no greater than the width of the upper face.

The width of the lower face may be less than the width of the upper face.

The covering arrangement, in its closed position, covers substantially the entire width of the lower face of the body.

The covering arrangement may comprise at least one door hingedly articulated adjacent an edge of the bottom face of the body.

The covering arrangement may comprise two doors hingedly articulated adjacent opposite edges of the bottom face of the body.

The pylon may further comprise a communication arrangement configured to facilitate transmitting one or more instructions from a control system of the aircraft to release the payload.

The pylon may be configured to accommodate, when the covering arrangement is in its open position, a payload carried thereby and having a circular cross-section in a plane perpendicular to the direction of travel of the aircraft, the cross-section having a width at least twice that of the lower face, in a direction mutually perpendicular to the vertical axis and to the direction of travel of the aircraft when mounted to the aircraft pylon, i.e., the covering arrangement does not interfere with the payload when carried by the carrying arrangement. Accordingly, the pylon may carry a payload having a width much larger than its own.

According to another aspect of the presently disclosed subject matter, there is provided a pylon configured for being mounted to a bottom surface of an aircraft and for carrying an external payload, the pylon comprising:

a body spanning along a vertical axis between an upper face and a lower face, the upper face comprising one or more mounting arrangements configured to facilitate mounting the pylon to the bottom surface of the aircraft, the lower face comprising at least one suspension mechanism configured to facilitate selective attachment of the payload to the pylon; and a covering arrangement configured for selective shifting between a closed position thereof in which it covers the suspension mechanism and an open position thereof in which the suspension mechanism is uncovered;

wherein the lower face of the body is characterized by a fixed width, in a direction mutually perpendicular to the vertical axis and to the direction of travel of the aircraft, which is no greater than 50% more than the width of the upper face of the body.

The width of the lower face may be no greater than the width of the upper face.

The width of the lower face may be less than the width of the upper face.

The width of the body may vary smoothly along the vertical axis between, inclusively, the upper and lower faces.

The covering arrangement, in its closed position, covers substantially the entire width of the lower face of the body.

The covering arrangement may comprise at least one door hingedly articulated adjacent an edge of the bottom face of the body.

The covering arrangement may comprise two doors hingedly articulated adjacent opposite edges of the bottom face of the body.

The pylon may further comprise a communication arrangement configured to facilitate transmitting one or more instructions from a control system of the aircraft to release the payload.

The pylon may be configured to accommodate, when the covering arrangement is in its open position, a payload carried thereby and having a circular cross-section in a plane perpendicular to the direction of travel of the aircraft, the cross-section having a width at least twice that of the lower face, in a direction mutually perpendicular to the vertical axis and to the direction of travel of the aircraft when mounted to the aircraft pylon.

The pylon may further comprise exterior indicator lights configured to display different patterns corresponding to open and closed positions of the covering arrangement.

According to another aspect of the presently disclosed subject matter, there is provided an aircraft pylon comprising a body for mounting to an aircraft, a suspension mechanism mounted on the body and being configured for attaching thereto payload, and a covering arrangement configured for selectively covering and uncovering at least a part of the suspension mechanism.

The covering arrangement can include an outer surface having a shape optimized to have pre-determined exterior interaction conforming to corresponding exterior interaction of the body. The corresponding exterior interaction of the body conforms to an exterior interaction of the aircraft. The exterior interaction can be one or more of the following: aerodynamic drag, aerodynamic noise, radar emission, IR emission.

The exterior interaction can include at least one parameter exterior to the aircraft which effects the operation of the aircraft in view of the intended use thereof.

The covering arrangement can be configured for selectively shifting between a closed position, in which at least a part of the suspension mechanism is covered, and an open position wherein a payload can be secured to the suspension mechanism. In the closed position the body and the covering arrangement can be configured to form together a homogenous structure configured to provide a homogenous exterior interaction.

The aircraft pylon can further comprise coupling means configured for releasably mounting of the body to an aircraft.

The suspension mechanism can comprise securing elements configured to be secured to corresponding securing elements provided on the payload. The suspension mechanism can be configured for an automatic releasing of the payload.

The covering arrangement can be configured to cover at least portions of the suspension mechanism form an undesired exterior interaction. Alternatively, the covering arrangement can be configured to cover the entire suspension mechanism. The covering arrangement can be configured to cover the suspension mechanism together with the payload secured thereto. The covering arrangement can include two doors, configured to pivot along the body.

The covering arrangement can comprise a single door pivoting along the body. Alternatively, the covering arrangement can comprise a sliding door configured such that the suspension mechanism is selectively covered or uncovered. According to an example, the covering arrangement can comprise a folding door configured to fold away from the suspension mechanism such that the payload can be secured thereto.

According to another aspect of the presently disclosed subject matter there is provided an aircraft comprising an aircraft body, a pylon having a pylon body for mounting to the aircraft body, a suspension mechanism mounted on the pylon body and being configured for attaching thereto a payload, and a covering arrangement configured for selectively covering and uncovering at least a part of the suspension mechanism.

The aircraft body can be configured with an optimized shape having a predetermined exterior interaction and the covering arrangement can include an outer surface having a shape optimized to have predetermined corresponding exterior interaction conforming to the exterior interaction of the aircraft body.

The exterior interaction can be one or more of the following: aerodynamic drag, aerodynamic noise, radar emission, IR emission.

The covering arrangement can be configured for selectively shifting between a closed position, in which at least a part of the suspension mechanism is covered, and an open position, in which a payload can be secured to the suspension mechanism. In the closed position the pylon body and the covering arrangement form together a structure being homogenous with the aircraft body and being configured to provide a homogenous exterior interaction therewith.

The aircraft can include a first mode, wherein the covering arrangement is in its open position, and payload can be secured to the suspension mechanism, and a second mode wherein the covering arrangement is in its closed position, and the aircraft body together with the pylon body and the covering arrangement provide an optimized shape with regards to the exterior interactions.

According to yet another aspect of the presently disclosed subject matter there is provided a method for optimizing a shape of an aircraft body, the method comprising: optimizing a shape of an aircraft body in view of the intended use thereof; selecting a pylon, having a pylon body for mounting to the aircraft body, selecting a suspension mechanism for mounting on the pylon body being configured for attaching thereto a payload; selecting a covering arrangement configured for selectively covering and uncovering at least a part of the suspension mechanism; and optimizing the shape of the pylon body and the covering arrangement in view of the intended use of the aircraft.

The method can further include determining the materials of which the pylon body is made.

Optimizing the shape of the aircraft body can include selecting an outer surface configured for a predetermined exterior interaction, and wherein the step of optimizing the shape of the pylon body and the covering arrangement includes selecting an outer surface configured for a corresponding predetermined exterior interaction conforming to the exterior interaction of the aircraft body.

The exterior interaction can be one or more of the following: aerodynamic drag, aerodynamic noise, radar emission, radar cross section, IR emission.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

Figure 1:
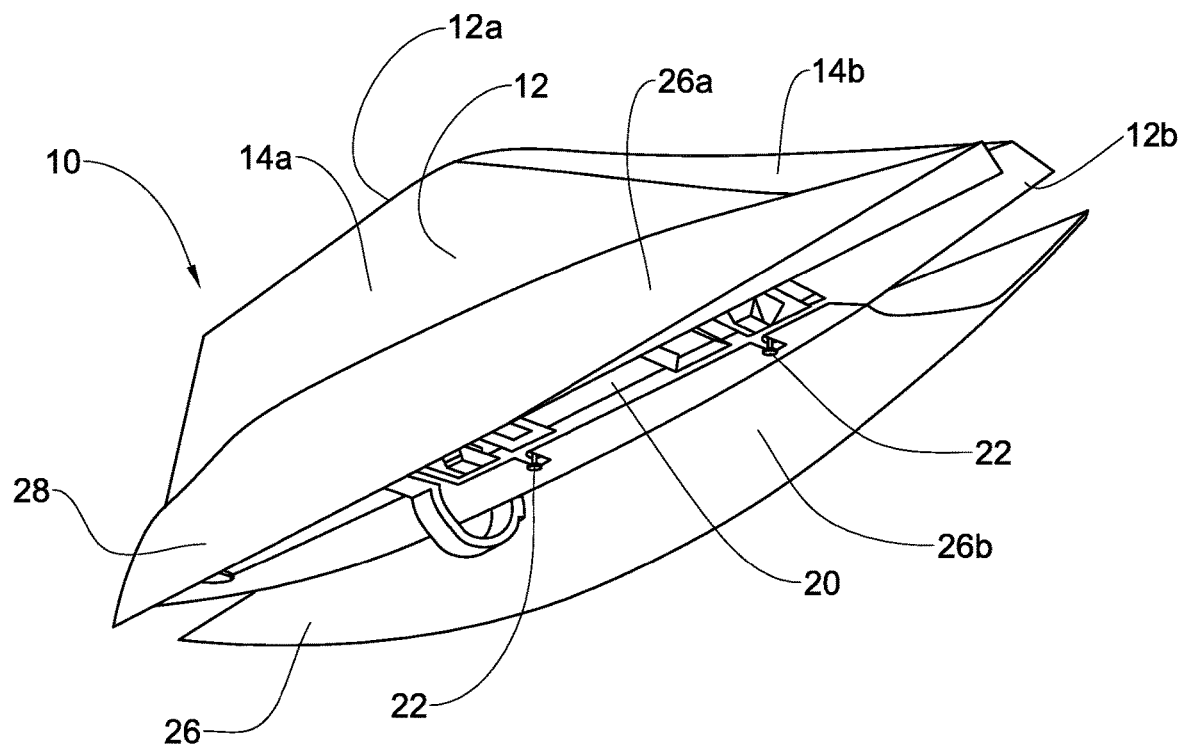
FIG. 1 is an isometric bottom view of an aircraft pylon in accordance with an example of the presently disclosed subject matter.
Figure 2:
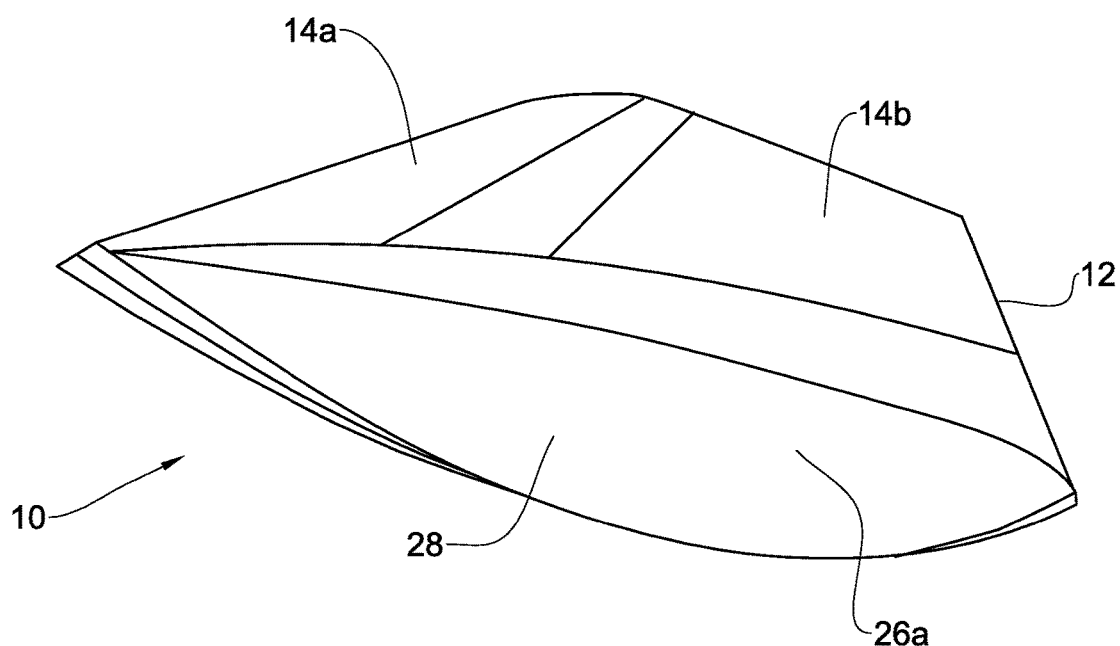
FIG. 2 is an isometric bottom view of the aircraft pylon of FIG. 1, in the closed position.

FIG. 1 shows a pylon 10, including a body 12 configured for mounting to an aircraft, for example to the bottom surface of a wing, or the fuselage thereof.

The body spans between an upper face 12a, configured to abut the aircraft when mounted thereon, and a lower face 12b along a vertical axis which is substantially parallel to the yaw axis of the aircraft. The width of the body 12 between the upper and lower faces 12a, 12b, i.e., in the direction of the pitch axis, may be constant along the vertical axis, or it may vary smoothly, i.e., it is characterized by a continuously turning tangent, i.e., any changes in the width along the vertical axis is unabrupt. Similarly, the two side of the pylon 10 spaced along the pitch axis of the aircraft may each be characterized by a smoothly curving shape.

It will be appreciated that herein the disclosure and claims, terms relating to direction, such as "upper," "lower," "above," "below," etc., and similar/related terms are used with reference to the orientation in the accompanying drawings based on a typical usage of the pylon 10 and its constituent elements, unless indicated otherwise or clear from context. Moreover, all references to the pylon 10 and/or portions thereof which are expressed in terms of axes of the aircraft, i.e., pitch, yaw, and roll, are used with reference to the pylon when mounted on the aircraft, for example as illustrated in the accompanying figures.

According to some examples, the width, i.e., along the pitch axis, of the lower face 12b of the body 12 is no larger than about 50% more than that of the upper face 12b. According to other examples, the width of the lower face 12b is smaller than that of the upper face 12a. According to further examples, the widths of the upper and lower faces 12a, 12b are substantially the same.

The body 12 includes an outer surface 14a configured with a shape optimized for one or more of various parameters, including, but not limited to, aerodynamic drag, aerodynamic noise, radar emission, IR emission, etc. The outer surface 14a can include for example a narrow portion 14b defined such that when the pylon is mounted on an aircraft the narrow portion is disposed in parallel with the traveling direction of the aircraft.

It is appreciated that the designing process of the body 12 and the outer surface 14a can include shape optimization methods, for example as is well known in the art.

The body 12 further includes one or more mounting arrangements (not shown) configured to facilitate mounting the pylon 10 to an aircraft. According to some examples, the mounting arrangements maybe configured to mount of the pylon such that it is secured to the aircraft throughout the duration of a flight, for example comprising rivets, bolts, welding portions, etc. According to some examples, the mounting arrangements are configured for being attached to a hard point of the airplane, for example as is well-known in the art.

The body 12 further includes one or more suspension mechanisms 20 at its lower face 12b being configured for attaching thereto the payload. Each suspension mechanism 20 may include one or more securing elements 22 configured to be secured to corresponding securing elements provided on the payload. The suspension mechanism 20 may further include a releasing mechanism (not shown) for selectively releasing the payload when secured to the securing elements 22. Accordingly, a communication arrangement may be provided within the body 12 to facilitate transmitting instructions from a control system of the aircraft to the release mechanism. This way, the payload may be released by the aircraft operator while the aircraft is in flight, for example wherein the payload is a drop tank, munitions, etc.

It is appreciated that the body 12 of the pylon 10 can be configured such that the payload mounted thereon does not interfere with the operation of the aircraft. That is to say, the body is configured to distance the payload from the wing, or other portions of the aircraft, so as to clear the control surfaces thereof as well as to prevent undesired disturbance of the flow of air toward the wing.

In addition, it is appreciated that the disposition of the suspension mechanism 20 on the body 12 can be determined in accordance with the size of the payload, the shape of the outer surface 14a, the dimensions of the body 12, and the location on the aircraft on which the pylon is mounted. That is to say, the disposition of the suspension mechanism 20 can be determined so as to allow securing payload thereto in a manner which will minimize the effect thereof on the operation of the aircraft.

The pylon 10 further includes a covering arrangement 26 configured for selectively covering and uncovering at least a part of the suspension mechanism 20. The covering arrangement 26 can include an outer surface 28 having a shape optimized to have pre-determined exterior interaction, such as a pre-determined aerodynamic drag, aerodynamic noise, radar emission, IR emission, etc.

It is noted that the term exterior interaction as referred to in this application can include any exterior parameter which effects the operation of the aircraft in view of the intended use thereof, with respect to the exterior environment. It is appreciated that the exterior interaction may differ depending on the aircraft, for example, a slight aerodynamic drag caused by a pylon may not affect the operation of an aircraft equipped with a powerful jet engine this is in comparison to a small aircraft. Similarly, considering the IR emission of a pylon body in a commercial aircraft may not be necessary. Thus, the exterior interaction can include any parameter which is required for the operation of the aircraft considering the intended use thereof.

The outer surface 28 can be configured such that the exterior interaction thereof conforms to corresponding exterior interaction of the body 12, or the outer surface 14a of the body. That is to say, if for example the outer surface 14a of the body 12 is configured with a predetermined magnitude of aerodynamics drag, the outer surface of the covering arrangement 26 is configured such that it forms a similar magnitude of aerodynamics drag. This way, the body and the covering arrangement form together a substantially homogenous structure which provides similar exterior interaction as required.

It is appreciated that the designing process of the covering arrangement 26 and the outer surface 28 thereof can include the same shape optimization method as in the designing process of the out surface 14a of the body. In fact, the shape optimization process of both the body 12 and the covering arrangement 26 can take into consideration similar parameters.

It is further appreciated that the shape optimization process of the body 12 and the covering arrangement 26 can be carried out as part of the shape optimization process of the entire aircraft. Thus, the exterior interaction of the outer surface 28 of the covering arrangement 26 can conform to the corresponding exterior interaction of the outer surface 14a of the body 12, as well as to the exterior interaction of the aircraft.

For example, if the aircraft is designed with a shape having a predetermined radar emission level, or radar cross section, the outer surface 14a of the body 12 as well as the outer surface 28 of the covering arrangement 26 can be designed such the radar emission level or the radar cross section thereof is conformed to that of the aircraft. This way, when the covering arrangement 26 is in its closed position covering the suspension mechanism 20, the aircraft can operate as a homogenous body even when a pylon is mounted thereon.

It is appreciated that the covering arrangement 26 can be configured to cover at least a part of the of the suspension mechanism 20, such that the shape and elements thereon do not cause an exterior interaction different than that of the outer surfaces of the body 12 and the covering arrangement 26. That is to say, since the suspension mechanism 20 may for example cause an undesired aerodynamic drag, the covering arrangement 26 is configured such that the suspension mechanism 20 is covered in a way that the aerodynamic drag is mitigated. Accordingly, the covering arrangement 26 can be configured to cover the entire suspension mechanism 20 or portions thereof which form an undesired exterior interaction. For example, if a rear portion of the suspension mechanism 20 faces a direction which is opposite to the traveling direction of the aircraft, the rear portion may not cause any undesired aerodynamic drag. Thus, the covering arrangement 26, in this example, can be configured to cover only the front or side portions of the suspension mechanism 20.

As explained hereinabove the required exterior interaction of the pylon and the covering arrangement depends on the intended use of the aircraft, thus determining which parts of the suspension mechanism 20 are to be covered may depend on the intended use of the aircraft, as well.

According to the illustrated example, the covering arrangement 26 comprises two doors 26a, 26b, each articulated to the body 12 adjacent an edge of the bottom face 12b thereof, such that it pivots along an axis parallel to the roll axis of the aircraft. According to this example, in the closed position, each door may cover substantially half of the width of the suspension mechanism 20. In the open position, on the other hand, each of the doors 26a, 26b is pivoted sidewardly, such that a payload can be disposed therebetween and be secured to the suspension mechanism 20. This allows the pylon 10 to accommodate payloads which are wider than the lower face 12b, for example as least twice as wide. It will be appreciated that the doors 26a, 26b may be designed to accommodate a payload of any desired size when the covering arrangement is in its open position.

It is appreciated that according to other examples, the covering arrangement can comprise a single door pivoting along any side of body 12 of the pylon 10, or can be a sliding door, configured to slide in any direction such that the suspension mechanism 20 is selectively covered or uncovered. According to the further example, the covering arrangement can comprise a folding door configured to fold away from the suspension mechanism 20 such that the payload can be secured thereto.

According to an example the covering arrangement can be configured to cover, in the closed position, the suspension mechanism 20 together with the payload secured thereto. For example, the suspension mechanism 20 can be configured to secure thereto a small device, such as a camera, and the covering arrangement can be configured with an outer surface which allows closing the door even when the device is secured to the suspension mechanism. This way, the door 26 can be opened to allow utilizing the device mounted on the suspension mechanism 20, and can be closed when the device is not in use so as to optimize the outer surface of the pylon, and to avoid undesired external interaction of the device or the suspension mechanism 20.

Figure 3:
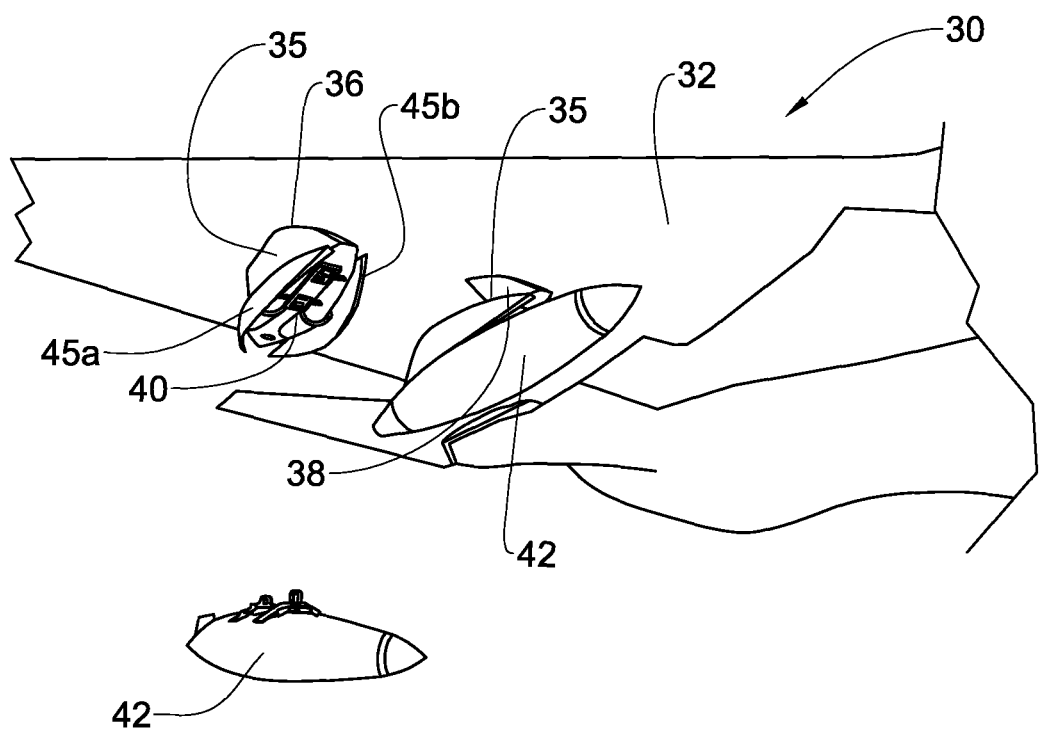
FIG. 3 is an isometric bottom view of an aircraft having the pylon of FIG. 1 mounted thereon; and, FIG. 4 is an isometric top view of an aircraft having the pylon of FIG. 1 mounted thereon.
Figure 4:
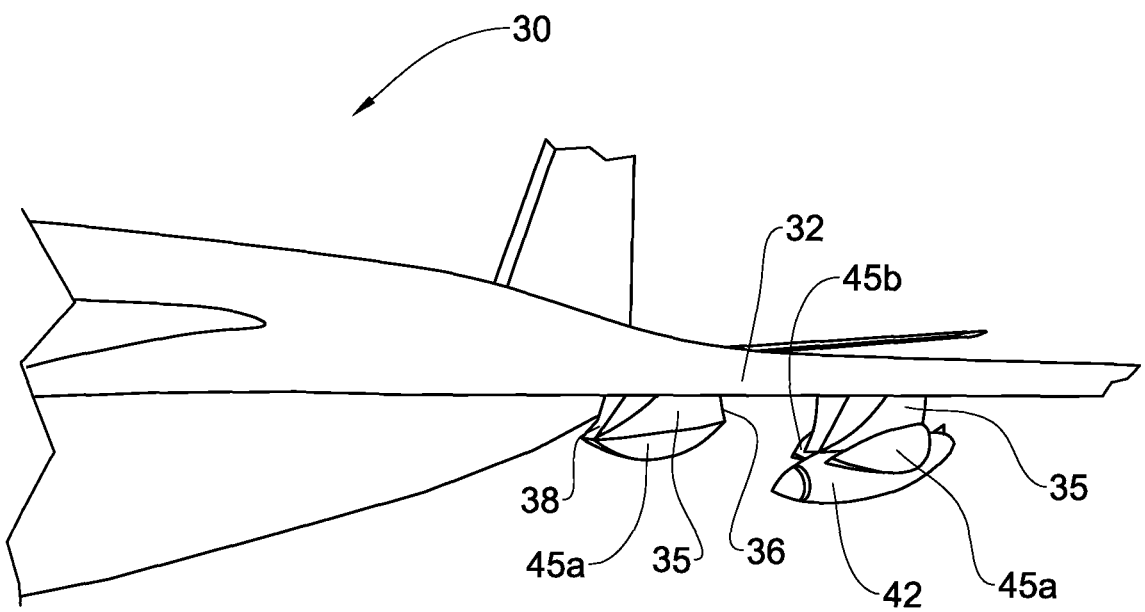

Reference is now made to FIGS. 3 and 4, an aircraft 30, can include one or more pylons 35 mounted thereon, for example on the bottom surface of the wing thereof 32. The pylons 35 include a body 36 having an outer surface 38, a suspension mechanism 40 mounted on a bottom surface 39 of the body 36 and configured to secure thereto a payload, here illustrated as an external drop tank 42. The suspension mechanism 40 is configured to automatically release the external drop tank 42.

The pylons 35 further includes a pair of doors 45a, 45b configured to pivot along the length of the pylon between a closed position in which the suspension mechanism 40 is covered, and an opened position in which the suspension mechanism 40 is uncovered allowing thereby to secure the external drop tank 42 thereto.

When the suspension mechanism 40 is not in use, and no payload is secured thereto, the doors 45a, 45b are pivoted to the closed position thereof, thereby covering the suspension mechanism 40 an providing an optimized outer surface to the pylon such which conforms with the outer shape of the aircraft 30. The doors 45a, 45b can be configured to automatically shift to the closed position thereof when the payload is released from the suspension mechanism 40. Thus, when the drop tank 42 is released the doors 45a, 45b automatically close thereby covering the suspension mechanism 40 and providing the pylon 35 with a homogenous outer surface optimized in accordance with the required parameters of external interaction.

Accordingly, the aircraft 30 and the pylon 35 can be selectively utilized in a first mode and in a second mode. In the first mode, the doors 45a and 45b are opened allowing thereby to secure the payload thereto, for example a drop tank 42. In the second mode, when the pylon 35 is not is use, for example when the drop tank 42 is dropped, the doors 45a and 45b are closed, thereby covering the suspension mechanism 40 and forming thereby an optimized homogenous shape together with the pylon body.

It is appreciated that in the first mode of the aircraft 30, when the doors 45a and 45b are opened, the shape of the entire aircraft including the pylon 35 and the payload secured thereto, may not have an optimized shape with regards to exterior interactions, as explained herein above. In the second mode, however, when the doors 45a and 45b are closed, the shape of the entire aircraft 30 including the pylon 35 provide an optimized shape with regards to the desired exterior interactions. Thus, in order to allow providing the aircraft 30 with and optimized shape, the doors 45a and 45b can be closed without having to remove the pylon 35 therefrom. It is further appreciated the aircraft operator can release the payload during the flight thereby, and shift the doors to the closed position, thereby shifting the aircraft to the second mode thereby optimizing the flight parameters. Due to the shape optimization provided by the external configuration of the pylon and the doors, in the second mode, the aircraft can achieve the same exterior interaction such as provided by similar aircrafts which are not provided with a pylon.

Those skilled in the art to which the presently disclosed subject matter pertains will readily appreciate that numerous changes, variations, and modifications can be made without departing from the scope of the invention, mutatis mutandis.

The invention claimed is:

1. A pylon configured for being mounted to a bottom surface of an aircraft and carrying an external payload, the pylon comprising:

a body spanning along a vertical axis between an upper face and a lower face, the upper face comprising one or more mounting arrangements configured to facilitate fixedly mounting the pylon directly to the bottom surface of the aircraft, the lower face comprising at least one suspension mechanism configured to facilitate selective attachment of the external payload to the pylon, wherein the suspension mechanism protrudes from the lower face in a direction away from the aircraft and is configured to hold the external payload farther from the aircraft than the lower face of the body is from the aircraft, in a direction along the vertical axis;

a covering arrangement configured for selective shifting between a closed position in which the covering arrangement covers the suspension mechanism and an open position in which the suspension mechanism is uncovered; and wherein when the covering arrangement is in the open position, the external payload carried thereby has a circular cross-section in a plane perpendicular to the direction of travel of the aircraft, the circular cross-section having a width greater than the lower face of the body, in a direction mutually perpendicular to the vertical axis and to the direction of travel of the aircraft when mounted to the aircraft, pylon.

2. The pylon according to claim 1, wherein the covering arrangement, in the closed position, covers substantially the entire width of the lower face of the body.

3. The pylon according to claim 1, further comprising a communication arrangement configured to facilitate transmitting one or more instructions from a control system of the aircraft to release the external payload.

4. The pylon according to claim 1, wherein the covering arrangement, in the closed position thereof, is configured to mitigate aerodynamic drag of at least the suspension mechanism.

5. The pylon according to claim 1, wherein the covering arrangement, in the closed position thereof, is configured to mitigate radar signature of at least the suspension mechanism.

6. The pylon according to claim 1, comprising exterior indicator lights configured to display patterns corresponding to open and closed positions of the covering arrangement.

7. The pylon according to claim 1, wherein the covering arrangement comprises at least one door hingedly articulated adjacent an edge of the lower face of the body.

8. The pylon according to claim 7, wherein the covering arrangement comprises two doors hingedly articulated adjacent opposite edges of the lower face of the body.

9. The pylon according to claim 1, wherein the lower face of the body is characterized by a fixed width which is no greater than 50% more than the width of the upper face of the body.

10. The pylon according to claim 9, wherein the width of the lower face is no greater than the width of the upper face.

11. The pylon according to claim 10, wherein the width of the lower face is less than the width of the upper face.

* * * * *